United States Patent [19]
Febvre et al.

[11] 3,893,028
[45] July 1, 1975

[54] PROBE MULTIMETER WITH DISPLAY INVERTING MEANS

[75] Inventors: Paul F. Febvre, Eybens, France; Virgil Lee Laing, Loveland, Colo.

[73] Assignee: Hewlett-Packard Company, Loveland, Colo.

[22] Filed: Oct. 16, 1973

[21] Appl. No.: 407,019

[52] U.S. Cl. ............................ 324/115; 324/72.5
[51] Int. Cl. ..................... G01r 1/08; G01r 15/08
[58] Field of Search ........... 324/115, 114, 72.5, 149

[56] References Cited
UNITED STATES PATENTS

| | | | |
|---|---|---|---|
| 3,501,697 | 3/1970 | Martin | 324/115 |
| 3,757,216 | 9/1973 | Kurtin et al | 324/72.5 |
| 3,782,324 | 1/1974 | Zembaty | 324/115 |

*Primary Examiner*—Alfred E. Smith
*Assistant Examiner*—Ernest F. Karlsen
*Attorney, Agent, or Firm*—William E. Hein

[57] ABSTRACT

A handheld multimeter for measuring electrical parameters is provided with a solid state display and associated means for inverting the displayed measurement result.

6 Claims, 6 Drawing Figures

INVERT DISPLAY FEATURES

SHEET 4

CHARACTER REFLECT LOGIC CIRCUITRY

PROBE MULTIMETER WITH DISPLAY INVERTING MEANS

BACKGROUND AND SUMMARY OF THE INVENTION

Electronic test and measurement instruments constructed according to the prior art have typically been bench-top units including both signal processing circuitry and a readout device for visually displaying measurement results to the user. Connection of such instruments to the various signals to be measured is generally made by means of a length of electrical cable. As a result, measurements involving these instruments are awkward in that the user must first make connection to the desired measurement point and then divert his attention to the instrument panel to observe the result. A more recent development in this area of the art has been that of a probe remotely connected to a processing instrument. Exemplary of such units is the Keithley Instruments Model 167 probe digital multimeter. While these units do provide a visual readout on the probe, they nevertheless are cumbersome to use in that freedom of movement of the probe is restricted by the cable connecting the probe to the processing instrument. In addition, the control switches are located at the processing instrument rather than on the probe itself. Furthermore, the visual readout is located at the opposite end of the probe from the point at which connection is made to the circuitry to be measured. Yet another disadvantage lies in the fact that the display position is fixed so that the operator must properly position himself with respect to the probe in order to view the displayed result.

Accordingly, it is an object of the present invention to provide a probe multimeter which is completely self-contained and which does not require connection to an associated processing instrument.

It is another object of the present invention to provide a probe multimeter having a visual display located adjacent to the point at which connection is made to the circuitry to be measured.

It is a further object of the present invention to provide a probe multimeter having means for inverting the displayed result, thus enabling the operator to observe the display from nearly any position.

These objects are accomplished in accordance with the preferred embodiment of this invention by employing a solid state seven-segment light-emitting diode (LED) display, character reflect logic circuitry for reflecting the information routed to each character position about the center of the display, and segment reflect logic circuitry for reflecting the segment information routed to each character about a center segment.

DESCRIPTION OF THE PREFERRED EMBODIMENT

Figure 1:
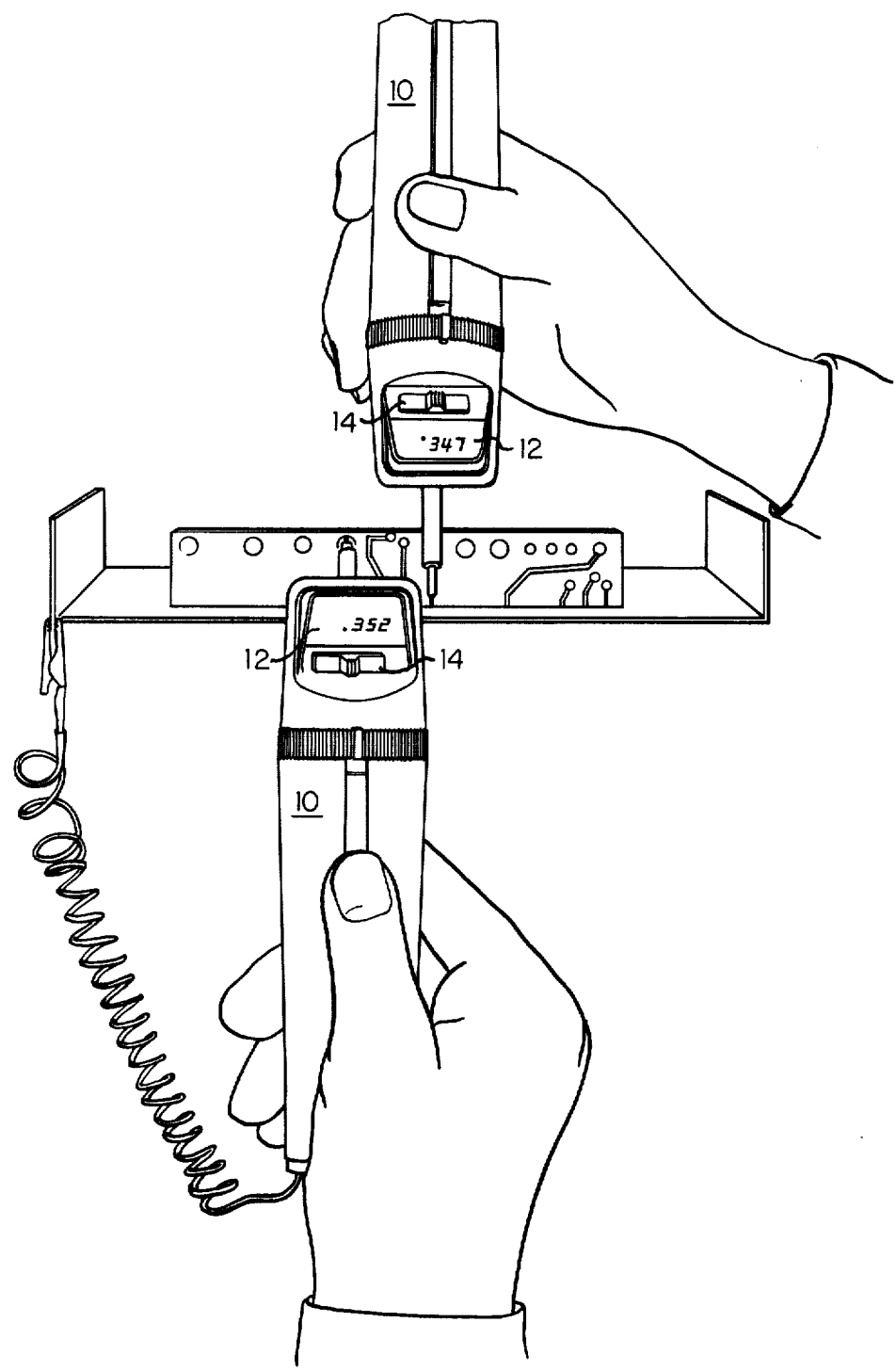
FIG. 1 is a pictorial diagram illustrating the use of a probe multimeter having an inverting display in accordance with the preferred embodiment of the invention.

Referring to FIG. 1, there is shown a probe multimeter 10 including an LED display 12 and a display invert switch 14. It can be seen from FIG. 1 that the multimeter may be held in nearly any position necessary to facilitate connection to the desired point of measurement, yet the display may be viewed from essentially a fixed position.

Figure 2:
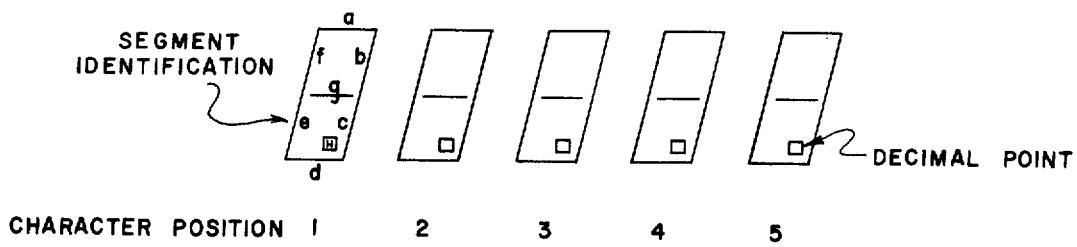
FIG. 2 is a diagram showing the segment and character identification of a seven-segment light-emitting diode (LED) display which is five characters wide.
Figure 3:
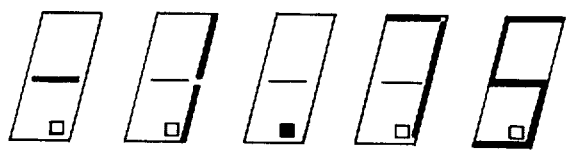
FIG. 3 is a diagram showing the segment activation required to display the number −1.75 within a five-character LED display.
Figure 4:
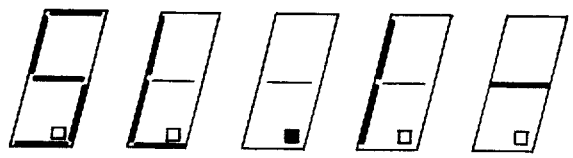
FIG. 4 is a diagram showing the displayed result of FIG. 3 in inverted form.

Referring now to FIG. 2, there is shown a five-character LED display with segment and digit positions labelled for discussion purposes. Every numeric character as well as some alphabetic characters and many special characters may be displayed at any character position by selectively energizing the segments, as illustrated in FIG. 3. The information displayed may be inverted, as shown in FIG. 4, by reflecting the information routed to each character position about position three and by reflecting the segment information routed to each character about segment g. This reflection of character position and segment information is summarized in the following table.

| UPRIGHT DISPLAY | INVERTED DISPLAY |
| --- | --- |
| Character Position 1 | Character Position 5 |
| Character Position 2 | Character Position 4 |
| Character Position 3 | Character Position 3 |
| Character Position 4 | Character Position 2 |
| Character Position 5 | Character Position 1 |
| Segment a | Segment d |
| Segment b | Segment e |
| Segment c | Segment f |
| Segment d | Segment a |
| Segment e | Segment b |
| Segment f | Segment c |
| Segment g | Segment g |
| Decimal Point (h) | Decimal Point (h) |

It should be recognized that while the preferred embodiment of the present invention involves the use of a seven-segment LED display which is five characters in width, the invention may be practiced using a display of different width and which may form characters by means of other segmenting arrangements. In addition, the present invention may be practiced without the use of a solid state display.

Figure 5:
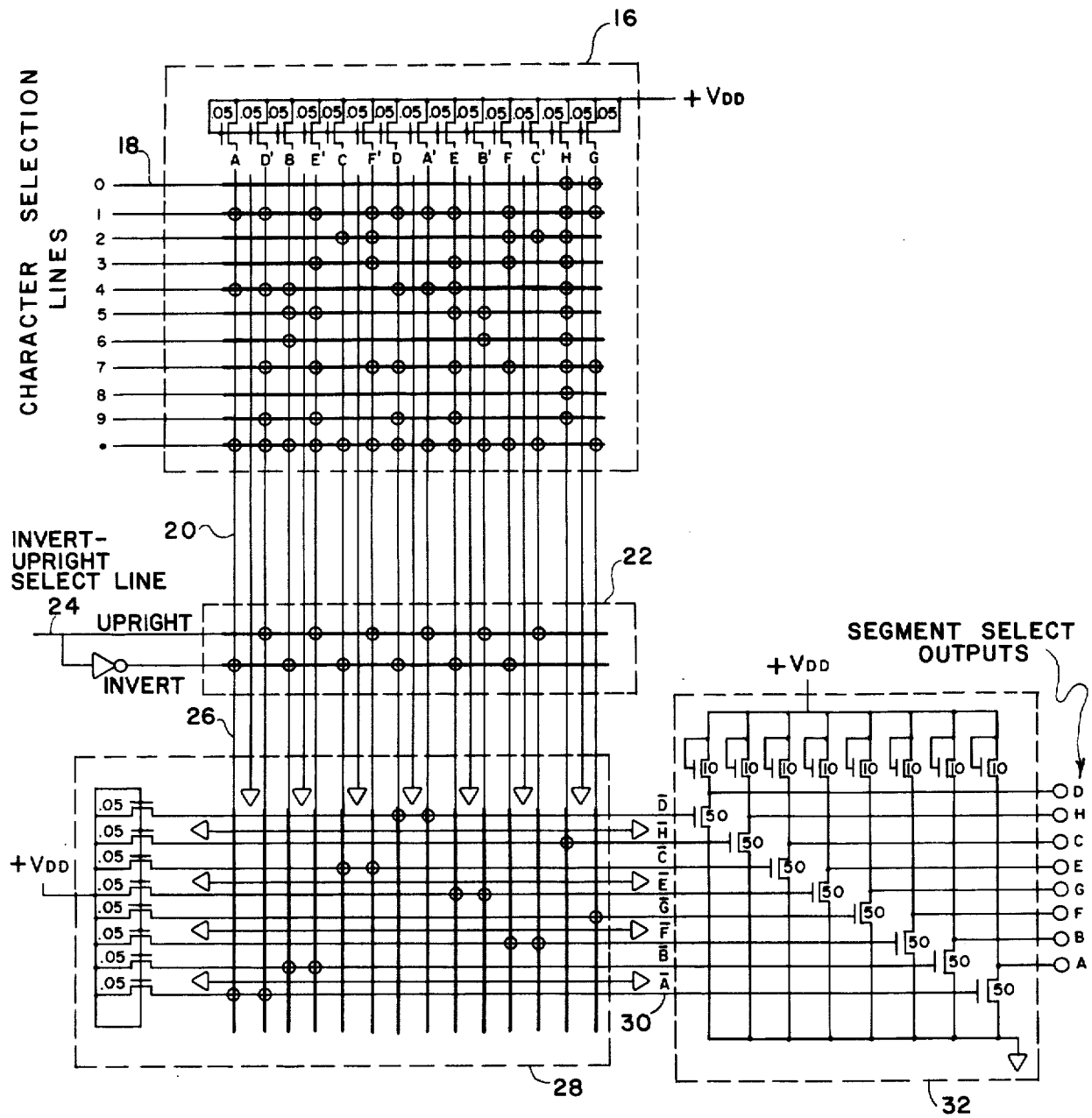
FIG. 5 is a detailed schematic diagram of segment reflect logic circuitry employed in the probe multimeter of FIG. 1.

Referring to FIG. 5, there is shown a detailed schematic diagram of segment reflect logic circuitry employed to reflect segment information routed to a given character position about segment g. A seven-segment decoding read-only memory (ROM) 16, having a bit pattern as shown, receives character selection information on one of a plurality of positive true input lines 18. A character is selected for display by pulling the appropriate one of input lines 18 high. The resulting segment information for both upright and inverted display modes is issued on a plurality of output lines 20. These lines are labelled to correspond with the segment labels of FIG. 2, with the primed segment labels indicating segments in the inverted display mode. A segment select ROM 22, having a bit pattern as shown, receives segment information for both the upright and inverted display modes from seven-segment decoding ROM 16 on lines 20. Selection of either the upright or inverted display mode is made by means of a line 24, which may be controlled, for example, by display invert switch 14 of FIG. 1. In response to selection of either display mode, ROM 22 issues the appropriate segment information on a plurality of output lines 26. These lines are connected to an eight-of-14 decoding ROM 28, having a bit pattern as shown, for decoding 14 lines of segment information associated with both the upright and inverted display modes into eight lines of segment information 30 corresponding to the selected display mode. Since this segment information is presented on lines 30 in negative true logic form, it may be desirable to include an eight-line inverter 32 for providing the same information in positive true logic form to facilitate direct coupling to well known LED display driving circuitry.

Figure 6:
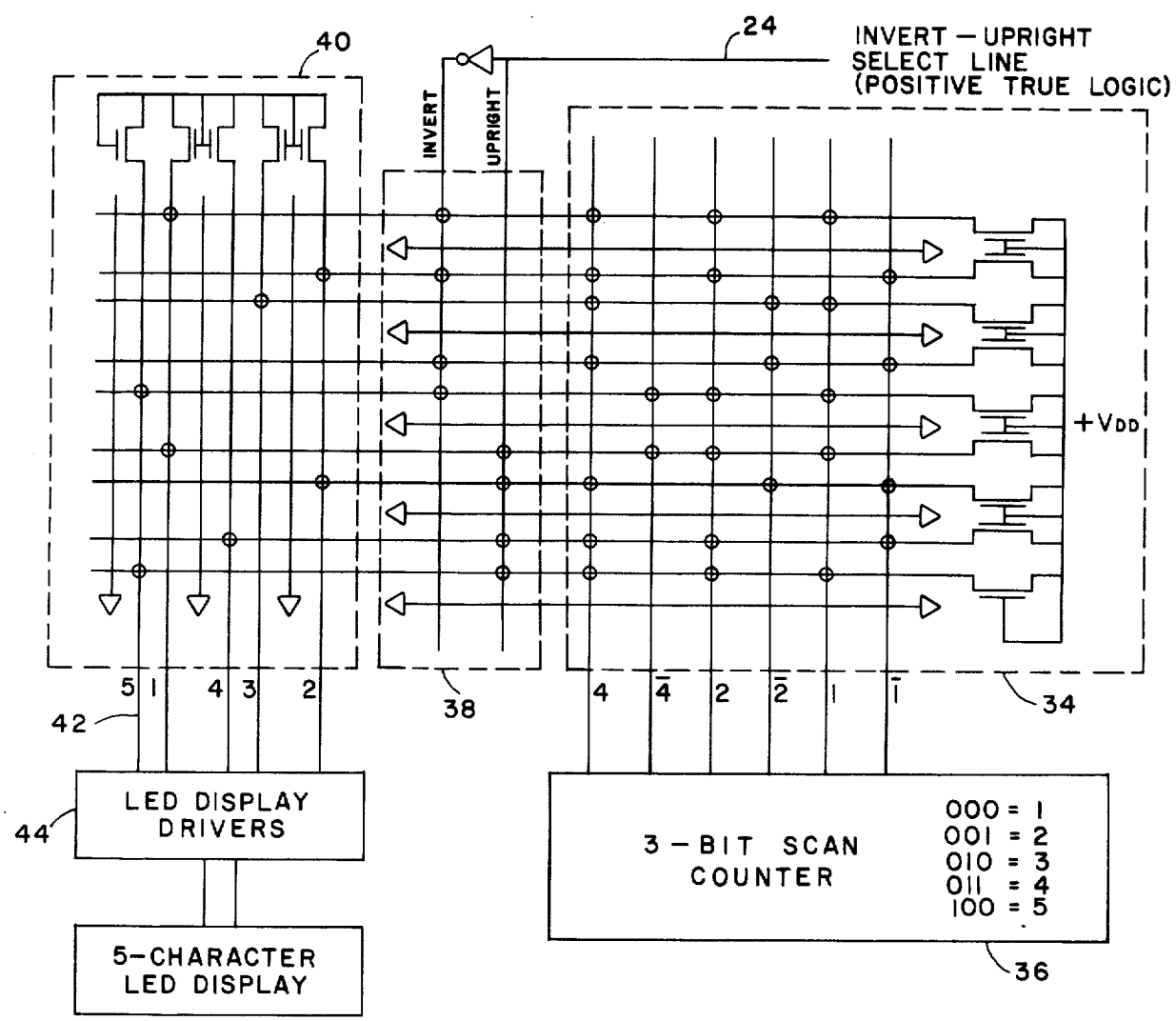
FIG. 6 is a detailed schematic diagram of character reflect logic circuitry employed in the probe multimeter of FIG. 1.

Referring now to FIG. 6, there is shown a detailed schematic diagram of character reflect logic circuitry employed to reflect information routed to each character position about position three. An encoding ROM 34 receives binary-coded-decimal information representing digits one through five from a three-bit scan counter 36. Scan counter 36 serves as a generator for strobing the LED display. That is, each of the five character positions is turned on and off in sequence. However, a sufficiently high strobe frequency is used to give the visual appearance that all character positions are turned on at all times. By strobing the display, it is necessary to provide only one segment reflect logic circuit, as shown in FIG. 5. If the display is not strobed, but instead each character position is turned on at all times, it would be necessary to duplicate the circuitry of FIG. 5 for each character position. Encoding ROM 34, having a bit pattern as shown, is employed to select the two character positions required at a given time in both the upright and inverted display modes. A character select ROM 38 designates the appropriate one of these two character positions, in response to selection of either the upright or inverted display mode. A nine-to-five decoding ROM 40, coupled to character select ROM 38, decodes the character position and issues an output in negative true logic form on one of five character position lines 42. These lines are coupled to conventional LED display driver circuitry 44 for activating the display associated with each selected character position.

All of the read-only memories employed in the preferred embodiment of this invention may employ N-channel enhancement mode MOS transistors. The detailed schematic diagrams of these memories, shown in FIGS. 5 and 6, include symbology well known in the art. For example, the dark lines within each ROM represent gate lines, and the narrow lines represent diffused N+ source and drain lines. The circles at the intersections of the narrow lines and the wide lines represent thin oxide gate regions of an MOS transistor whose source electrode is logic ground.

We claim:

1. Electrical signal measuring apparatus comprising:
   display means for visually displaying character information indicative of a measurement result, said display means comprising one or more character positions;
   switch means for selecting either an upright or an inverted display mode of operation;
   first logic means coupled to said display means and switch means, said first logic means being responsive to selection of the inverted display mode of operation for reflecting upright character information associated with each of said character positions about a central one of said character positions; and
   second logic means coupled to said display means, switch means, and first logic means, said second logic means being responsive to selection of the inverted display mode of operation for reflecting upright character information associated with each of said character positions about a central portion of each respective character position.

2. Electrical signal measuring apparatus as in claim 1 wherein said first logic means comprises a first group of read-only memories.

3. Electrical signal measuring apparatus as in claim 2 wherein said display means comprises a seven-segment display at each character position, and wherein said second logic means comprises a second group of read-only memories for reflecting segment information associated with each of said character positions about a central segment of each respective character position.

4. Circuitry for inverting a character message visually displayed within an electronic display which includes one or more character positions, said circuitry comprising:
   switch means for selecting either an upright or an inverted display mode of operation;
   first logic means coupled to said display and switch means, said first logic means being responsive to selection of the inverted display mode of operation for reflecting upright character information associated with each of said character positions about a central one of said character positions; and
   second logic means coupled to said display, switch means, and first logic means, said second logic means being responsive to selection of the inverted display mode of operation for reflecting upright character information associated with each of said character positions about a central portion of each respective character position.

5. Circuitry as in claim 4 wherein said first logic means comprises a first group of read-only memories.

6. Circuitry as in claim 5 wherein characters are formed by means of a seven-segment display at each character position, and wherein said second logic means comprises a second group of read-only memories for reflecting segment information associated with each of said character positions about a central segment of each respective character position.

* * * * *